US 6,685,127 B2

(12) United States Patent
Takano et al.

(10) Patent No.: US 6,685,127 B2
(45) Date of Patent: Feb. 3, 2004

(54) METHOD OF WINDING ARMATURE OF REVOLVING-FIELD ELECTRIC MACHINE AND ARMATURE

(75) Inventors: Tadashi Takano, Shuuchi-gun (JP); Susumu Ando, Shuuchi-gun (JP); Yoshio Kato, Komaki (JP)

(73) Assignee: Kabushiki Kaisha Moric, Shuuchi-gun (JP)

( * ) Notice: Subject to any disclaimer, the term of this patent is extended or adjusted under 35 U.S.C. 154(b) by 0 days.

(21) Appl. No.: 10/064,545

(22) Filed: Jul. 25, 2002

(65) Prior Publication Data
US 2003/0085314 A1 May 8, 2003

(30) Foreign Application Priority Data
Aug. 3, 2001 (JP) ........................................ 2001-235692

(51) Int. Cl.$^7$ ............................................. H02K 15/085
(52) U.S. Cl. ................................ 242/432.2; 242/432.5; 29/605
(58) Field of Search ............................... 242/432, 432.1, 242/432.2, 432.3, 432.4, 432.5, 432.6, 434, 434.7; 29/605

(56) References Cited

U.S. PATENT DOCUMENTS

| 2,949,789 | A | * | 8/1960 | Eminger | ........................ 74/23 |
| 3,995,785 | A | * | 12/1976 | Arick et al. | ............. 242/432.4 |
| 5,622,332 | A | * | 4/1997 | Bennitt et al. | ............... 242/439 |
| 6,108,897 | A | * | 8/2000 | Beakes et al. | ................. 29/596 |
| 6,325,318 | B1 | * | 12/2001 | Stratico et al. | .......... 242/433.4 |
| 6,533,209 | B2 | * | 3/2003 | Stratico et al. | .......... 242/432.4 |
| 2003/0168547 | A1 | * | 9/2003 | Komuro et al. | .......... 242/432.5 |

FOREIGN PATENT DOCUMENTS

| EP | 1111761 A | 6/2001 |
| JP | 60167854 | 8/1985 |

* cited by examiner

Primary Examiner—Emmanuel Marcelo
(74) Attorney, Agent, or Firm—Ernest A Beutler

(57) ABSTRACT

An automatic machine and method of winding of armatures having maximum coil density because the winding nozzle does not enter into the slots between the pole teeth and the wire is restrained at at least one the ends of the core portion of the armature to facilitate winding.

17 Claims, 10 Drawing Sheets

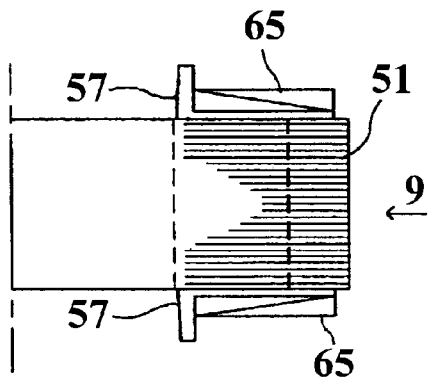
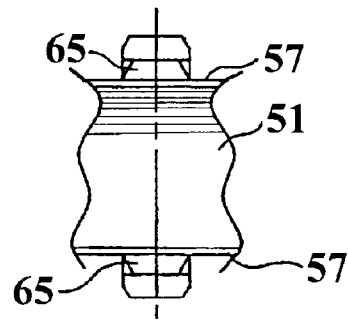
FIG. 8  FIG. 9
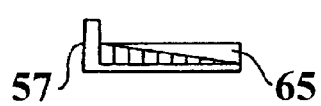
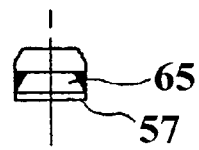
FIG. 10  FIG. 11
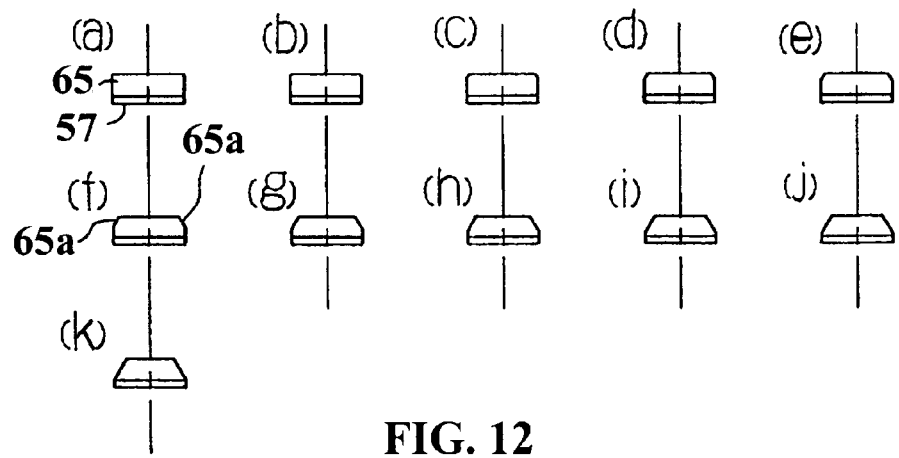
FIG. 12

METHOD OF WINDING ARMATURE OF REVOLVING-FIELD ELECTRIC MACHINE AND ARMATURE

BACKGROUND OF INVENTION

This invention relates to a method of winding armatures for revolving-field electrical machines and more particularly to an improved winding method that permits a greater coil density to be obtained and avoids the likelihood of damaging the wire by the winding needle during the winding operation.

Various methods have been employed for forming the coil windings for the armature of rotating electrical machines such as motors or generators. Generally these winding methods result in somewhat complicated structures and structures wherein the maximum coil densities are not capable of being obtained. Several of these methods involved passing a needle in the slot between the extending cores of the armature and then having that needle circumscribe the individual cores so as to form the windings. Because of the fact that the needle must be passed in the space between the cores, room must be left for it and this decreases the coil density.

In addition, there is a likelihood that the needle may engage already wound coils and damage them particularly by removing their insulation. These various prior art methods are described in full detail in the co-pending application assigned to the Assignee hereof, entitled "Stator Coil Structure For Revolving-Field Electrical Machine and Method Of Manufacturing Same", U.S. app. Ser. No. 09/683764, filed Feb. 12, 2002.

Disclosed in that co-pending application are several ways in which the coil can be wound without necessitating the passage of the winding needle through the slots between adjacent pole teeth. This involves looping the wire around the pole teeth in a lasso type fashion and effecting movement of each winding along the pole tooth toward the circular core of the armature. In order to assist in this pulling action, devices have been provided on the insulating bobbins around which the wire is looped or the end of the wire is held in some fashion at this end of the pole tooth. If the insulator is provided with these projections, then it is necessary to cause movement of the needle to this end of the pole tooth at the side thereof in order to provide the attachment or looping. This somewhat complicates the mechanism and also adds parts unnecessarily to the bobbin.

It is, therefore, a principal object to this invention to provide an improvement in this type of winding arrangement wherein a separate system is provided for positioning the wire ends at the ends of the core portion of the armature to facilitate winding.

It is a further object to this invention to provide an improved apparatus for performing this function.

SUMMARY OF INVENTION

A first feature of the invention is adapted to be embodied in a method of winding the coils of a rotating electrical machine. In this method, a circular core of magnetic material with a plurality of magnetic pole teeth extending radially from the circular core is provided. Each of the magnetic pole teeth defines a core and slots formed there between. Each of the slots defines a mouth that is formed between adjacent outer ends of the cores. The winding method comprises the steps of positioning a threading needle having an opening through which the wire for the winding of the coils is fed into proximity to one of the mouths. The needle opening is moved in a path around one of the pole teeth and at one side of the slot without moving the needle in any substantial distance along the length of the one pole tooth to form a first winding. A portion of at least the initial winding is restrained at the circular core side of the pole tooth. The movement of the needle opening is continued in a path around the one of the pole teeth at the one side of the slot without moving the needle in any substantial distance along the length of the one pole tooth to form succeeding windings. Each of which in combination with the pulling action of restrained winding portion forces the previous winding along the pole tooth toward the circular core without requiring movement of the needle in any substantial distance along the length of the one pole tooth so that the needle not be moved any substantial distance into the slot.

A further feature of the invention is adapted to be embodied in an apparatus for performing the aforenoted method of winding the coils of a rotating electrical machine. In this apparatus a threading needle having an opening through which the wire for the winding of the coils is fed is provided. A drive is provided for moving the needle opening in a path around one of the pole teeth and at one side of the slot without moving the needle in any substantial distance along the length of the one pole tooth to form a first winding. A restraining mechanism restrains a portion of at least the initial winding at the circular core side of the pole tooth so that when movement of the needle opening is continued in a path around the one of the pole teeth at the one side of the slot without moving the needle in any substantial distance along the length of the one pole tooth to form succeeding windings the pulling action of restrained winding portion forces the previous winding along the pole tooth toward the circular core without requiring movement of the needle in any substantial distance along the length of the one pole tooth so that the needle not be moved any substantial distance into the slot.

BRIEF DESCRIPTION OF DRAWINGS

FIG. 8 is a cross sectional view of one of the poll teeth of this embodiment with the coil winding removed.

FIG. 9 is a partial end elevational view taken in the direction of the arrow 9 in FIG. 8 but again not showing the skewing of the pole teeth.

FIG. 10 is a cross sectional view of the upper bobbin half taken along the same plane as FIG. 8.

FIG. 11 is an end elevational view looking in same direction as FIG. 9.

FIGS. 12a–12k are a series of cross sectional views taken at equal intervals along the length of FIG. 8 starting at the base of the pole tooth (left hand side) and ending at the tip (right hand side) thereof.

DETAILED DESCRIPTION

Figure 1:
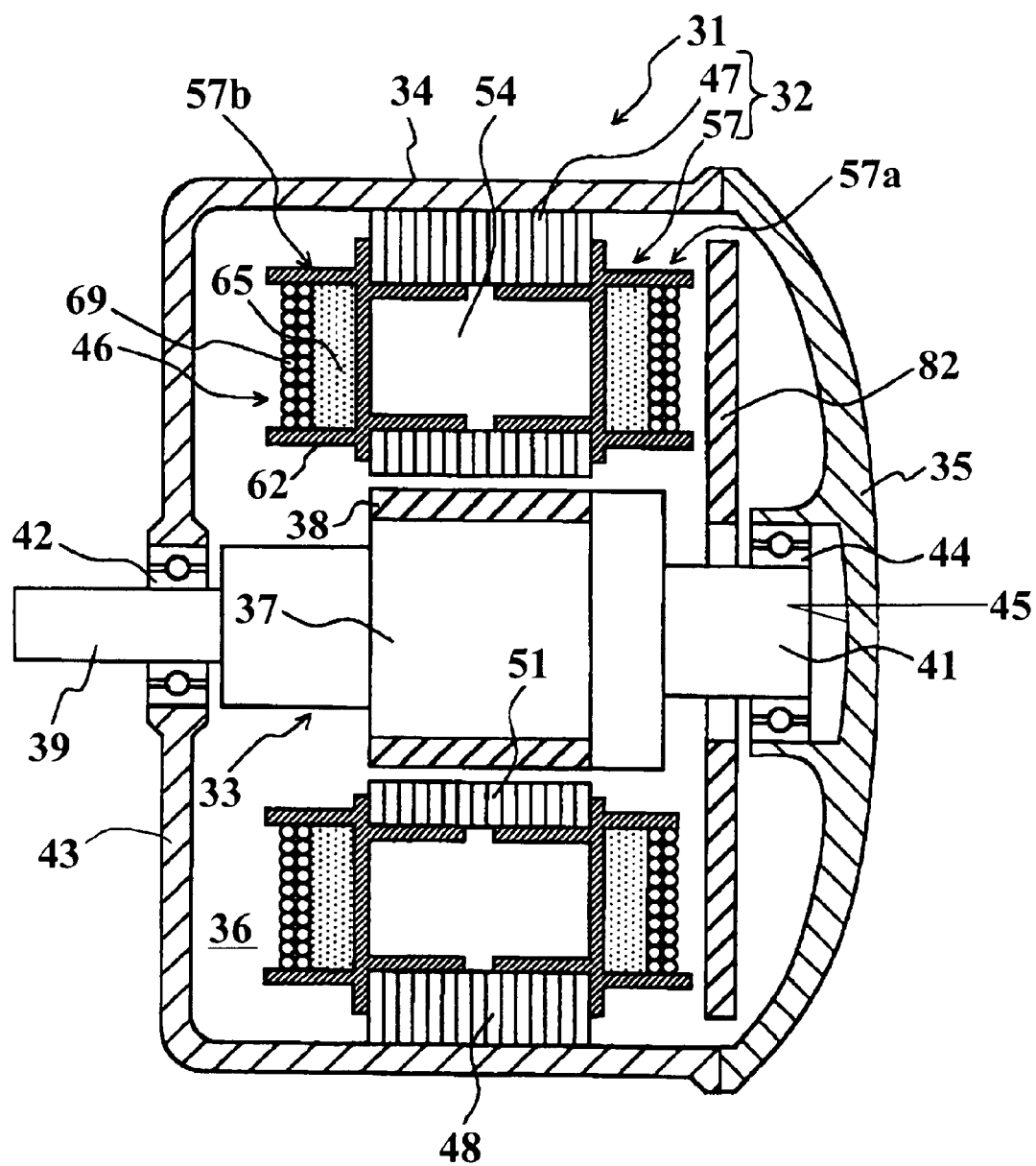
FIG. 1 is a cross sectional view taken through a rotating electrical machine formed by a method and apparatus in accordance with one embodiment of the invention.

Referring now in detail to the drawings and initially to the construction shown in FIGS. 1 through 16, with primary reference first to FIG. 1, a rotating electric machine constructed in accordance with the invention is identified generally by the reference 31. The rotating electric machine 31 may be either an electric motor or a generator depending upon the desired application.

The rotating electrical machine 31 is comprised of a stator assembly, indicated generally by the reference numeral 32, and a rotor assembly, indicated generally by the reference numeral 33. These components are contained within a housing assembly that is comprised of a cup shaped, main housing piece 34 and a cover plate 35, which is suitably attached thereto to form an enclosure 36 in which the stator assembly 32 and rotor assembly 33 are positioned.

The rotor assembly 33 is formed with a central portion 37 on which a plurality of circumferentially spaced permanent magnets 38 having alternating polarity are affixed in a known manner. The end portions of the rotor assembly 33 comprise shaft portions 39 and 41 that are journalled, respectively, in bearings 42 carried by an integral closure wall 43 of the cup shaped, main housing piece 34 and bearings 44 carried in a recessed portion 45 of the cover plate 35.

The construction of the rotor assembly 33 may be deemed to be of the general conventional type and any type known in this art might be employed. Also, although the described machine employs an arrangement wherein a coil winding assembly, indicated generally by the reference numeral 46 is provided on individual armature poles, to be described, formed on the stator assembly 32, it should be understood that the coil winding assembly 46 can be mounted on the rotor assembly 33 and the permanent magnets 38 may be mounted as part of the stator assembly including the cup shaped, main housing piece 34.

Figure 2:
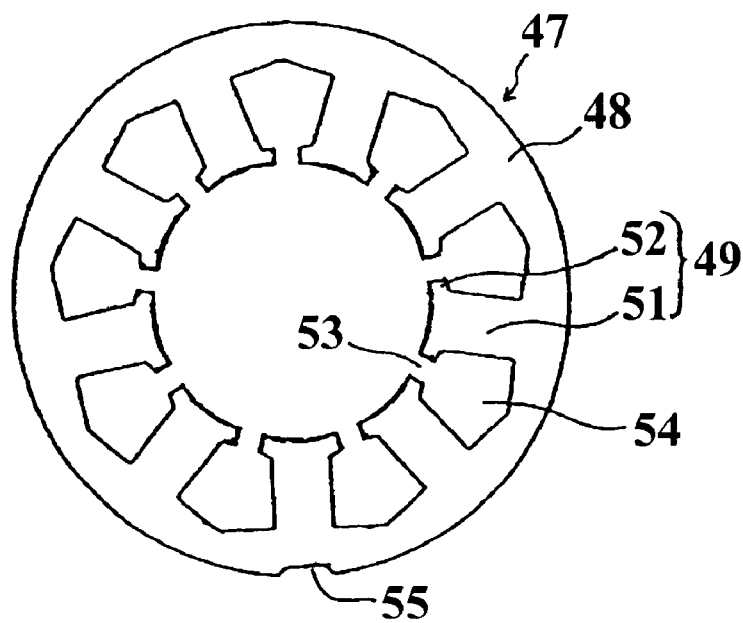
FIG. 2 is an end elevational view of the laminations of the magnetic core looking from one side but not showing the skewing of the pole teeth.
Figure 3:
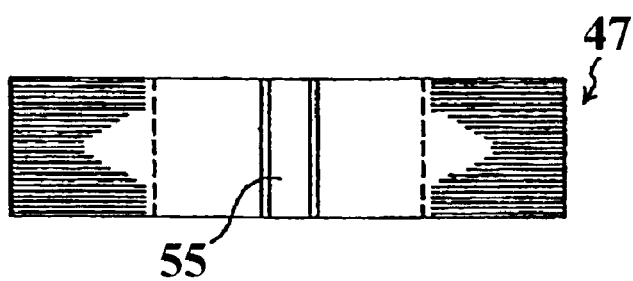
FIG. 3 is a side elevational view of the core.
Figure 4:
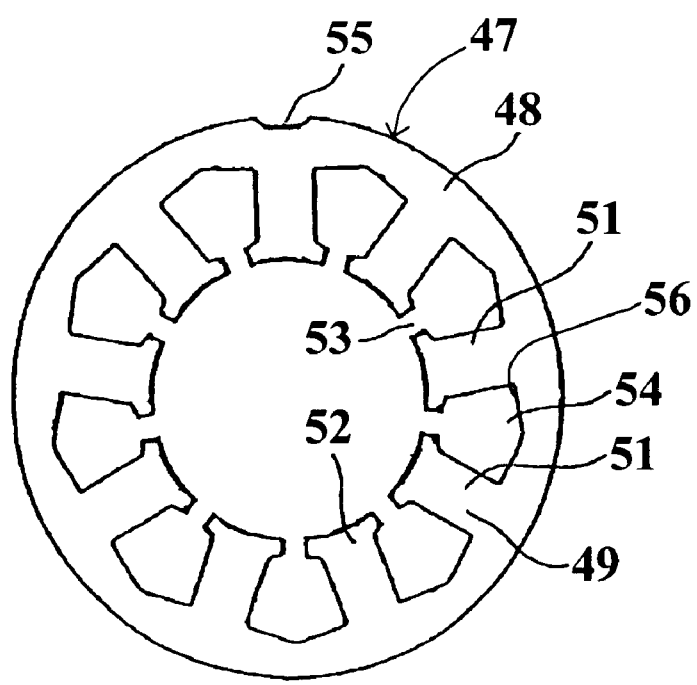
FIG. 4 is end elevational view of the core looking in the opposite direction from FIG. 2 but again not showing the skewing of the pole teeth.

The stator assembly 32 is comprised of an armature core, indicated generally by the reference numeral 47, which is made up of a plurality of laminated armature plates as shown in FIGS. 2 through 4. In this embodiment, since the armature core 47 is the outer element of the rotating electric machine 31, it is comprised of a circular portion 48 from which a plurality of pole teeth, each indicated generally by the reference numeral 49, extend. The pole teeth 49 have generally rectangular portions 51 that extend outwardly from the circular portion 48 and which terminate in enlarged, projecting ends 52. Gaps 53 are formed between adjacent ends of these projecting ends 52, which form the outer termination of slots 54, formed between adjacent pole teeth 49.

In order to assist in the alignment of the lamination of the core pieces of the armature core 47, each of them is formed with a reference slot 55 on the outer periphery of their circular portion 48. This slot 55 assists in alignment as well as location within the cup shaped, main housing piece 34.

The ends of the slots 54 adjacent the circular portion 48 of the armature core 47 is defined by angularly disposed surfaces 56 formed on opposite sides of the bases of each of the pole teeth 49. These act as projections that cooperate with the projecting ends 52 at the outer ends of the teeth 49 so as to assist in locate an insulating bobbin forming members 57 around which the coil winding assembly 46 is formed as well as locating the individual windings themselves.

The insulating bobbin forming members 57 are comprised of right and left hand sections 57a and 57b, which have a substantially identical construction, except as will be hereinafter described.

Like the armature core 47, the insulating bobbin forming member 57 is comprised of a circular portion 58 that has an L-shaped cross section and from which extend individual legs 59 of a generally U-shape which is complimentary to and snuggly received on the core pole teeth 49. Inclined surfaces 60 at the base of these legs 59 cooperate with the aforenoted angularly disposed surfaces 56 formed at the outer ends of the pole teeth 49 so as to provide a stop or abutment against which the coil windings actually engage. This construction also facilitates alignment.

Figure 5:
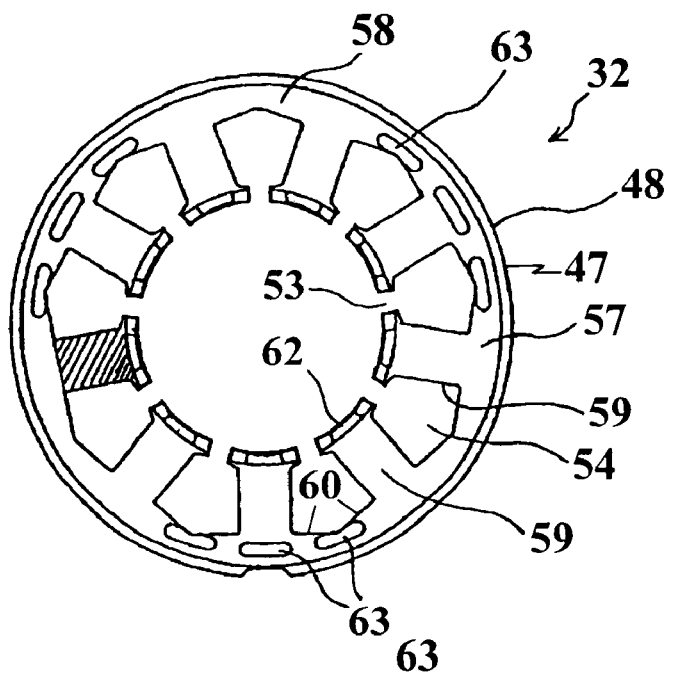
FIG. 5 is an end elevational view, in part similar to FIG. 2, but shows the construction with the insulator in place with one portion of the insulator shaded to show how the side of the insulator is configured to assist in the winding operation but again not showing the skewing of the pole teeth.
Figure 6:
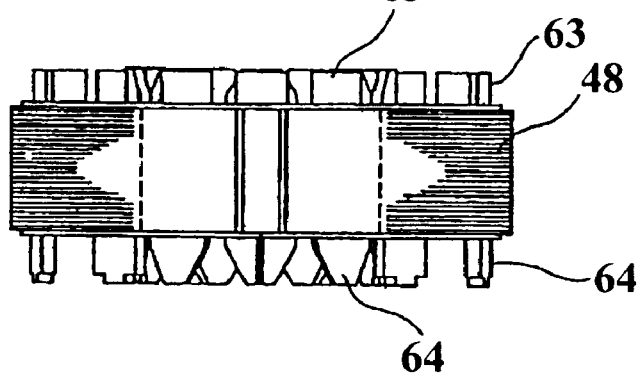
FIG. 6 is a side elevational view, in part similar to FIG. 3, but shows the core assembly with the insulator in place.
Figure 7:
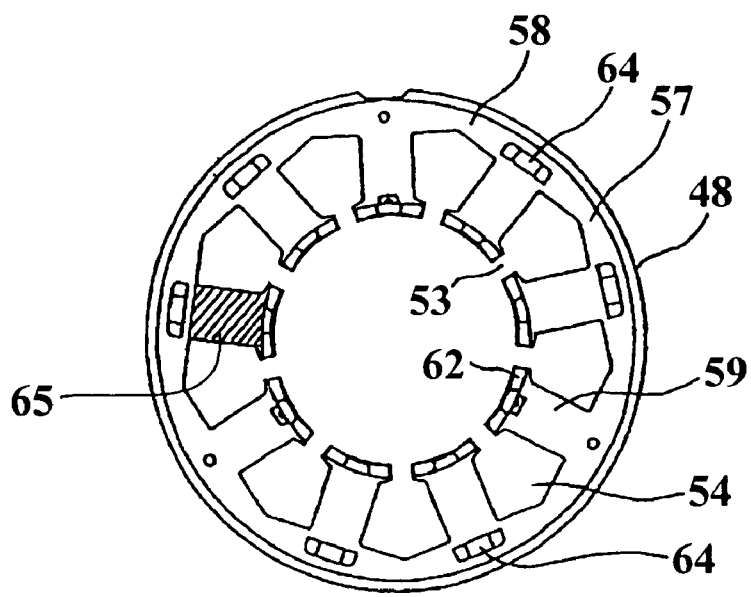
FIG. 7 is an end elevational view, in part similar to FIG. 4 looking in the opposite direction from FIG. 5 and showing one portion of the insulator shaded to show how the side of the insulator is tapered but again not showing the skewing of the pole teeth.
Figure 13:
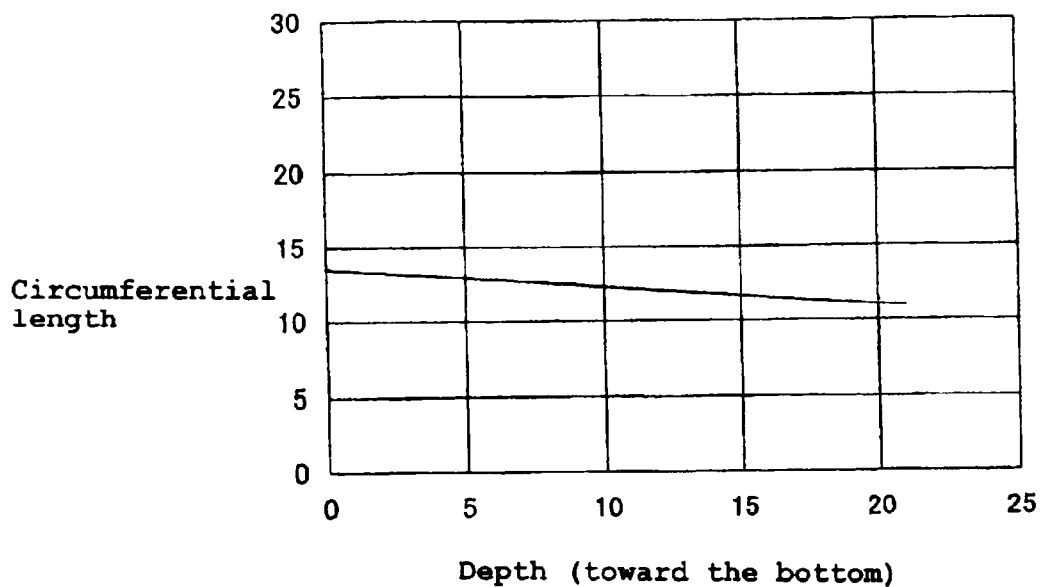
FIG. 13 is a graphical view showing how the configuration of the circumference changing member affects the winding circumference.

As may be seen in FIGS. 5 through 7, the outer periphery of the circular portion 58 of the insulating bobbin forming member 57 extends to a lesser circumferential extent than the outer periphery of the circular portion 48 of the armature core 47.

At the outer periphery of the insulator legs 59 and in the area between the slot gaps 53, the insulating bobbin forming member 57 have axially extending flange portions 61. These flange portions 61 are substantially co-extensive with the projecting ends 52 of the armature core portions 51. In addition, an arcuate portion 62 interconnects these axially extending flange portions 61 and extends axially outwardly so as to provide an abutment against which the coil winding assembly 46 will be confined as hereinafter noted.

Further projections, indicated at 63, are formed at circumferentially spaced locations around the periphery of the insulating bobbin forming member 57, at least one of which is aligned with the insulator leg portion 59 and another of which is positioned adjacent the intersection between the inclined surfaces 60 as best shown in FIG. 5. This construction is formed at one side of the insulator on one of the insulating bobbin forming member 57a or 57b. The spacing of these projections is chosen in order to facilitate the passage of wires connecting the individual coils of the coil winding assembly 46. On the other side, there are similar further projections, indicated at 64, which may form a similar purpose.

Special insulator inserts indicated by the reference numeral 65 are placed on the faces of the insulator legs 59 on one or preferably both of the insulators in the area between the respective arcuate portions 62 and further projections 63 and 64 thereon. These insulators are shown in lines in FIGS. 6 and 8 so as to indicate their relationship to the respective insulating bobbin forming member 57a or 57b.

The shape of these insulator inserts 65 is chosen so that they act as circumference changing devices for a purpose that will be described now by reference to FIGS. 8–12. A circumference changing member 65 according to the invention is used in place of the before-mentioned taper members 65. The circumference changing member 65 may be a separate member from the insulating bobbin forming members 57 or a member molded integrally therewith.

As shown best in FIG. 12, the circumference changing member 65 is chamfered as indicated at 65a at its opposite ends on the upper surface wherein the amount of this chamfering is gradually increasing from the positions of (a) through (k) toward the outer periphery. This gradually shortens the surface length of the circumference changing member 65 and accordingly the length or circumference around which each turn of the coil winding 46 makes progressing toward the tips of the pole teeth 51.

Gradually shortening the circumference in such manner allows a drawing support point of the winding that is drawn out of the needle to be disposed on the outer periphery side and allows the winding to easily slide outward when the winding is wound around the inner periphery side. Therefore, the needle winding action outside of the slot 54 (out of the inner periphery side in this example) or adjacent the inlet of the slot 54 without inserting the needle into the slot 54 allows the winding to be wound on the magnetic pole tooth 51 to the bottom side of the slot 54. In this case, as to the needle winding action, it is desirable to increase trail displacement of the loop to the extent of providing slack in the winding in order to carry out the winding action.

Thus, the drawing support point of the winding drawn out of the needle is located at the bottom of the slot to provide slack in the winding for the needle's winding action, which enables the winding to smoothly slide down to form the coil 46 on the magnetic pole tooth 51 while keeping the height of the circumference changing member 65 constant.

However the upper surface of the circumference changing member 65 may be inclined downwardly toward the bottom side as with the before-mentioned taper members 65. Forming such an inclined surface also enables the winding to slide down to the bottom side as described before. However, forming such an inclined surface makes the height of the circumference changing member on the inlet side of the slot greater, resulting in a large protrusion of the coil ends, and therefore, a greater profile thereof in the radial direction, as aforenoted. With respect to this, keeping the height constant as in the example shown in FIGS. 8–12 enables to obtain a stator with a compact profile.

It should be noted that the further projections 63 and 64 need not be formed at the base of each of the pole teeth 49 because of the inclined surfaces 60 formed thereat which will tend to preclude the wire from slipping down along the incline below that point.

Figure 14:
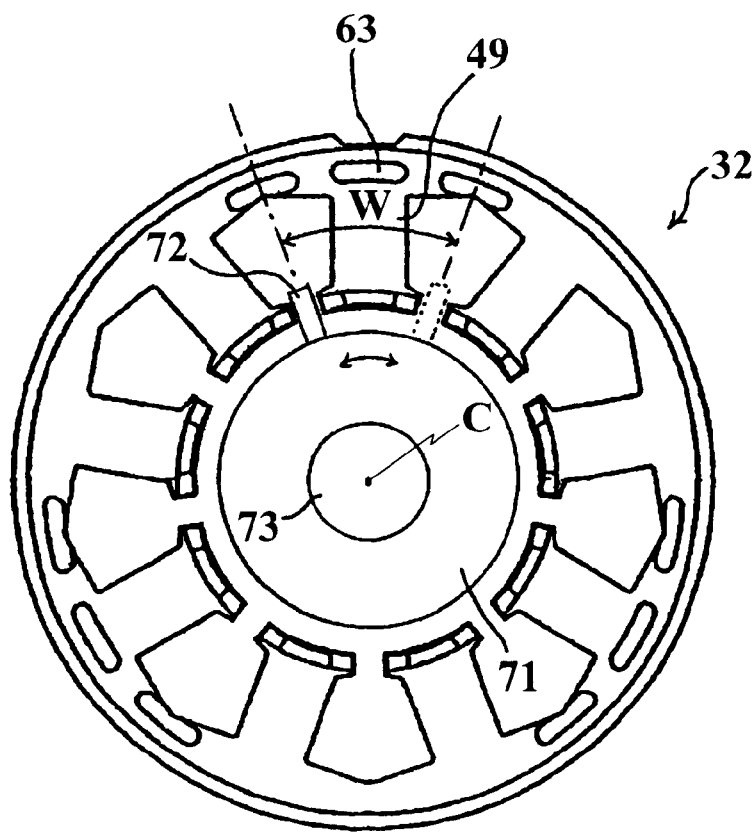
FIG. 14 is a view, in part similar to FIG. 5, and shows how the winding needle is associated with the slots between the pole teeth during the winding operation.

The method by which the winding is accomplished may be best understood and will now be described initially by reference primarily to FIGS. 14 through 16. The winding apparatus includes a needle carrier 71 that carries a winding needle 72 having a suitable configuration. The needle carrier 71 and needle 72 are formed with wire guide opening 73 through which the individual enameled wire strand 69 passes from a feed roll 74. The path of wire travel is indicated by the arrows R in FIG. 16.

Figure 16:
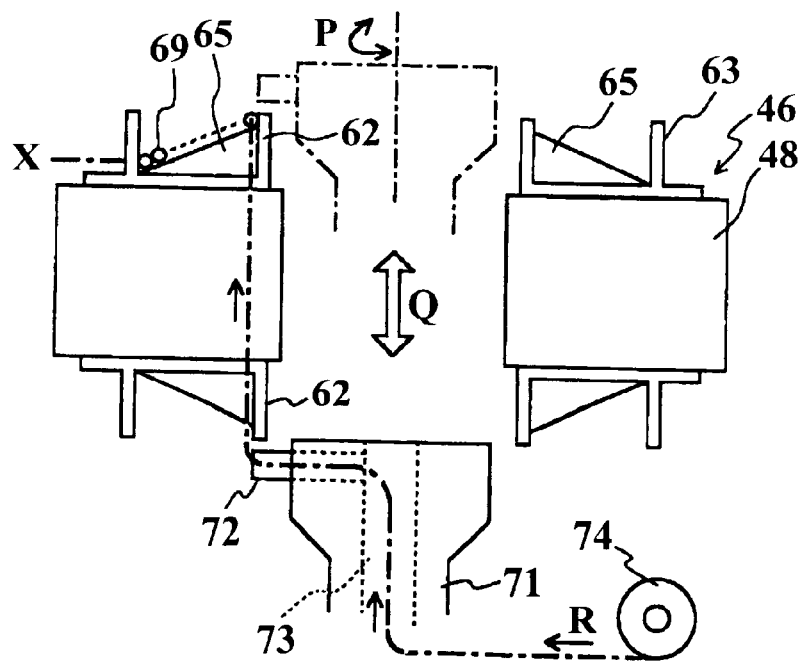
FIG. 16 is partial top plan view showing the actual configuration of the winding apparatus and the way that the motion shown in FIG. 15 is achieved.
Figure 17:
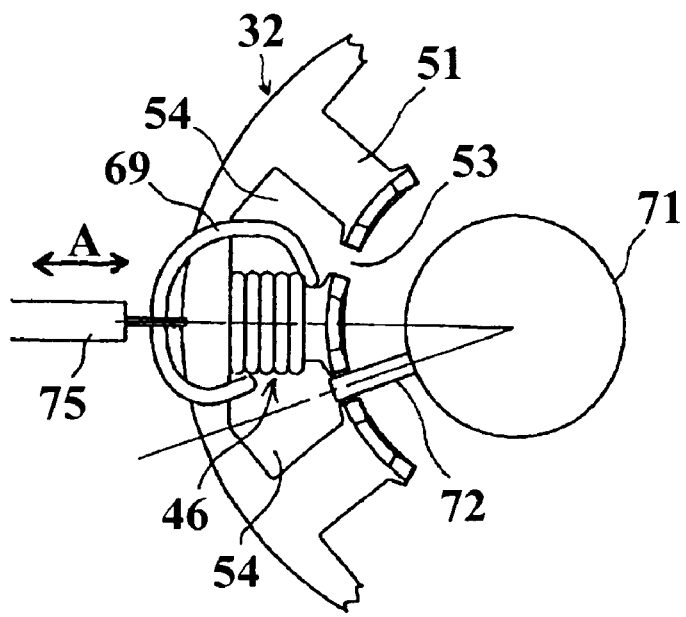
FIG. 17 is a view, in part similar to FIG. 16, but looking from above and showing how the hooking device in accordance with this embodiment functions to retain the coil winding at the circular core portion of the armature.
Figure 18:
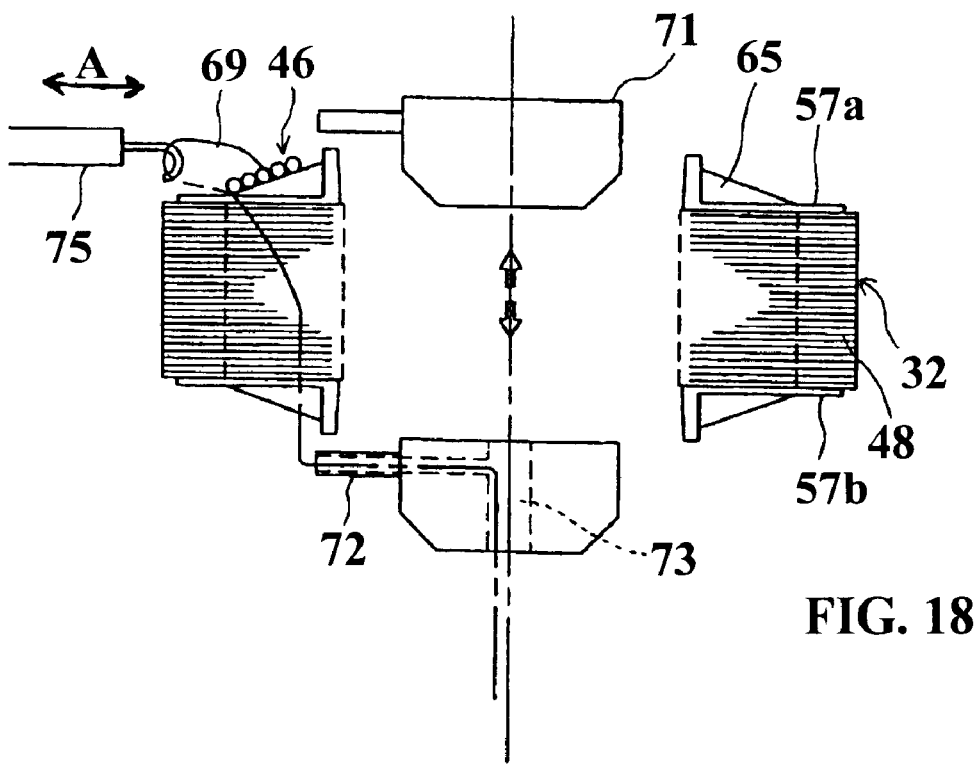
FIG. 18 is a cross sectional view, looking in the same direction as FIG. 16 but showing the hooking structure of FIG. 17.

Initially, one end of the wire is clamped at the position shown at X in FIG. 16, this being disposed radially outwardly beyond the end of the armature core 47 to form one end of one of the coil windings of the coil winding assembly 46. This is done in a manner as will be described later by reference to FIGS. 17–21. In this way, when the windings are formed, the bulging portion that overlies the wire end will not fill the slots 54 but will be positioned in an axial direction outwardly from these gaps and along one side face of the individual pole teeth 49.

Figure 15:
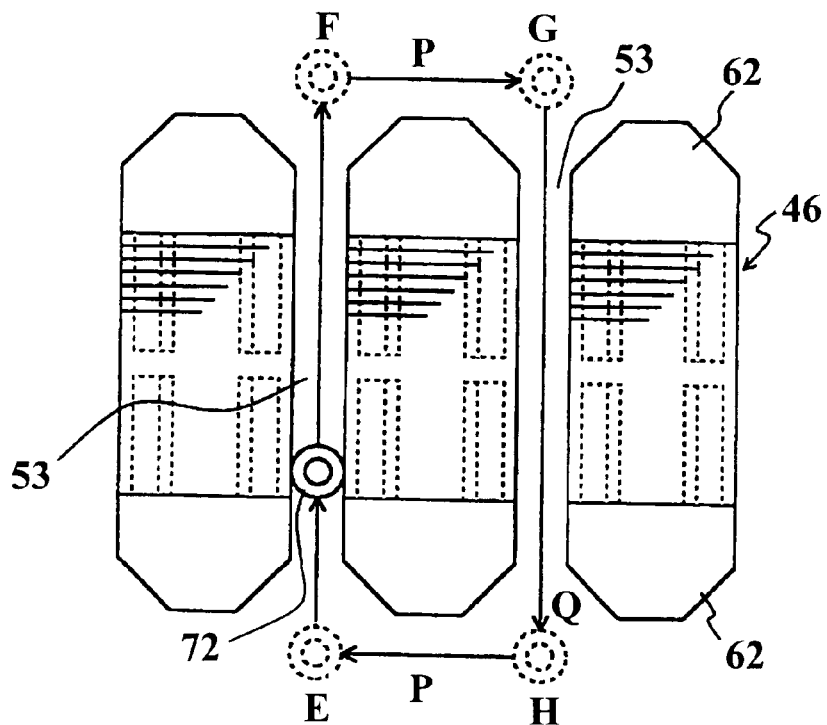
FIG. 15 is a view showing the path that the winding needle takes during the winding operation in accordance.

The needle carrier 71 generally moves in a rectangular pattern around the individual pole teeth 49 and their overlying insulating bobbin forming members 57 as seen in FIG. 15. The winding needle 72 also rotates, as shown by the arrow in FIG. 14, through an arc W as it encircles the individual pole tooth 49. The needle 72 can either be radially positioned in the area immediately inside of the slot 54 in the area formed in the gaps 53 between the projecting ends 52 at the ends of the pole teeth 49, or radially inwardly of this area as long as during the winding operation the wire will contact the inner edge of the arcuate portion 62 of the insulating bobbin forming member 57.

As the wire is wound, it will be trapped by these edges and will engage the axially outermost portion of the insulator insert 65. Thus, as the needle traverses the path shown by the arrows P in FIG. 15, the wire strands 69 will be engaged with the axial outermost portions of the insulator insert 65. After traversing this area, then the needle 72 and needle carrier 71 is moved in the area indicated by the arrows Q in the radial direction between the adjacent pole teeth 49 and specifically the area of the slots 54.

As each winding is completed, the next winding will engage the previous winding and force it down the incline of the insulator insert 65 so that the wires will collect at the radial outer periphery of the slots 54. There the wire will be restrained by the inclined surfaces 60 of the insulating bobbin forming members 57.

Then, the next series of windings is made and is provided a very neat winding without bulges and which occupies substantially one half at the gap between the pole teeth 49 in the slots 54. This provides a very dense coil and insures maximum output of the machine.

In this case, the winding is drawn out of the tip of the needle 72 to the extent of providing slack in the winding to allow the trail movement of the loop of the tip of the needle 72 to be greater than the length of the coil turn. The drawing support point X of the winding is fixedly located at a point further outside than the bottom side end of the slot 54, thus to provide slack in the winding for its winding action, so that the winding is displaced in the direction of the drawing support point X through a lassoing action while the coil is wound on the magnetic pole tooth 51.

The structures for retaining the wire in the area at the radial ends of the pole teeth 51 during the winding will now be described by reference to FIGS. 17–24. A hook member 75 is placed radially outside of the circular core portion 48 of the armature 32 and axially above it in this example. The hook member 75 is reciprocal in the longitudinal direction of the magnetic pole tooth 51 as indicated by the arrows A.

The hook member 75 serves the purpose of hooking the winding 69 fed out of the tip of the needle 72 and drawing it toward the root of the magnetic pole tooth 51. At this time, the needle 72 may be extended toward the root of the magnetic pole tooth 51 from the needle carrier 71 or may be moved toward the root of the magnetic pole tooth 51 together with the needle carrier 71.

The hook member 75 for drawing the winding 69 out of the needle 72 can also be used as means for extending a loop of the winding 69 formed by the winding action of the needle 72 to provide some slack in the winding as described later. Providing same slack in the winding makes it possible to form the coil 69 on the magnetic pole tooth 51 without inserting the needle 72 into the slots 62.

When the winding 69 is slid on the peripheral length changing member 65 of the magnetic pole tooth 51 from the inner peripheral side end toward the root side thereof to form the winding 46, subsequent turning of the needle 72 with the winding 69 in the path shown in FIG. 15 while being held to the side of the root of the magnetic pole tooth 51 with the hook member 75 caused the winding 69 to be securely urged toward the root side of the magnetic pole tooth 51.

At the same time, by securely holding the winding 69 at a winding starting part of the second layer of the coil, the winding 46 is wound into a coil on the peripheral length changing member 65 in an aligned manner without being disordered. As described above, by turning the needle 72 with the winding 69 held to the side of the root of the magnetic pole tooth 51 with the hook member 75, the coil 69 can securely be formed around the magnetic pole tooth 51 without inserting the needle 72 into the slots 62.

Figure 19:
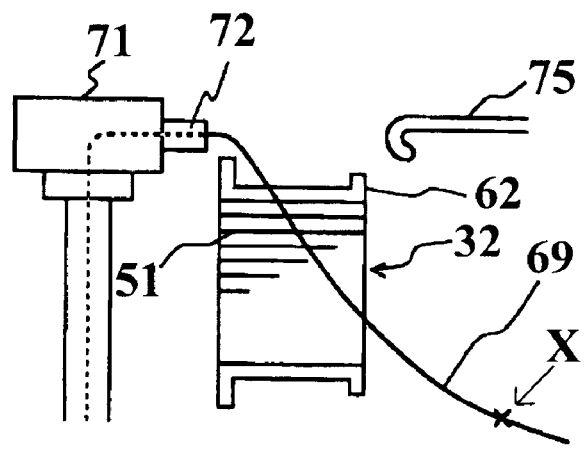
FIGS. 19 through 24 are sequential views showing how the hooking device operates to capture and locate the cable at the pole tooth ends during the winding operation and is looking in the opposite direction from FIG. 18.

FIGS. 19–24 illustrate the coil winding method using the hook member 75 according to the present invention in sequence. As shown in FIG. 19), the winding 69 drawn out of the needle 72 is clamped at an anchor point (indicated by X) positioned outside (backside) the armature 32 (magnetic pole tooth 51) as seen from the needle 72 side.

Figure 20:
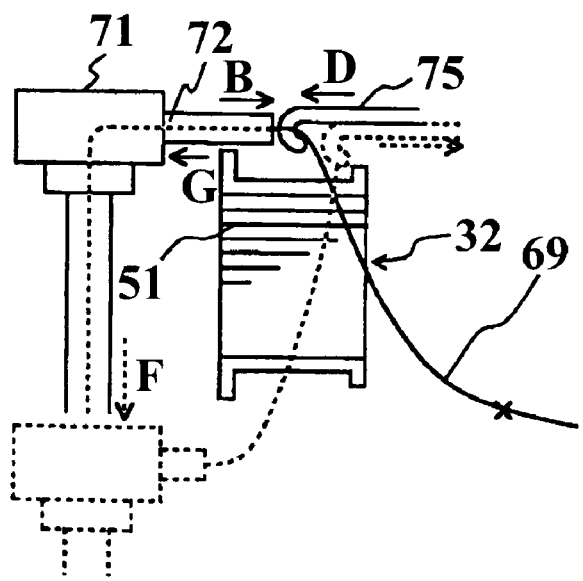

Then, as shown in FIG. 20, the needle 72 is extended as indicated by the arrow B and the hook member 75 is moved toward the needle 72 as indicated by the arrow D to hook the winding 69. The hook member 75, over which the winding 69 has been hooked, is drawn back as indicated by the arrow E. The needle 72 is then drawn back as indicated by the arrow G as the needle 72 is moved downwardly along the axis C as indicated by the arrow F.

Figure 21:
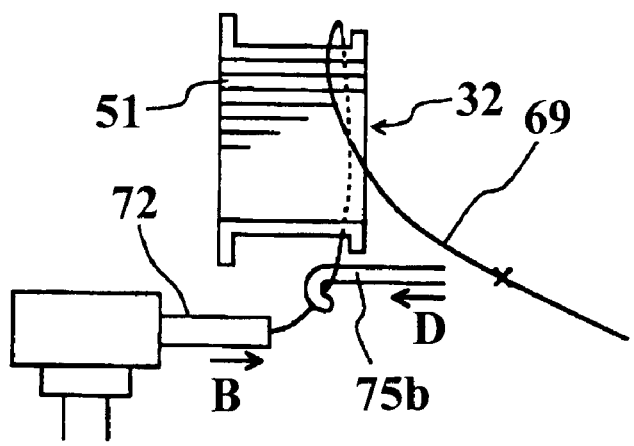
Figure 22:
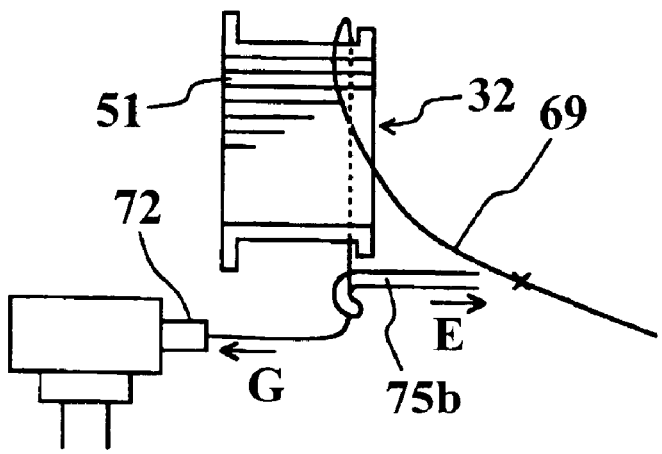

Subsequently and as shown in FIG. 21, the needle 72 is extended (arrow B) below the magnetic pole tooth 51 of the armature 32 and a lower hook member 75b is moved toward the needle 72 (arrow D) to hook the winding 69. Then, as shown in FIG. 22, the hook member 75b is drawn back toward the side of the root of the magnetic pole tooth 51 (arrow E) and the needle 72 is drawn back (arrow G).

Figure 23:
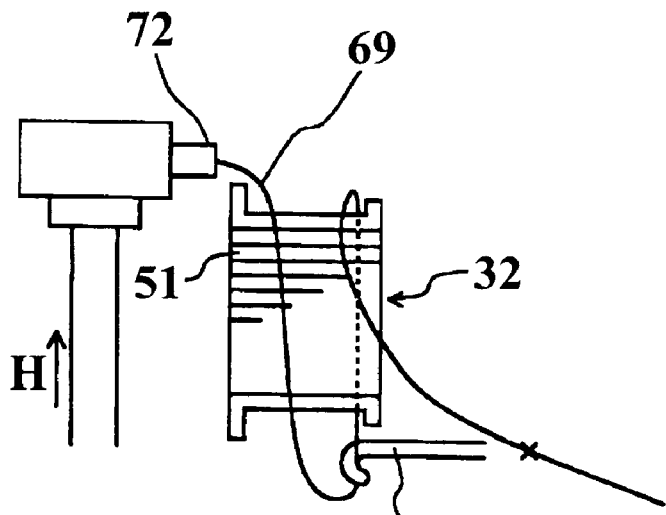

After this action and as shown in FIG. 23, the needle 72 is raised along the axis C (arrow H) with the hook member 75, over which the winding 69 has been hooked, drawn back toward the side of the root of the magnetic pole tooth 51 (arrow H). Thereby, one turn of the coil is completely wound on the magnetic pole tooth 51.

Figure 24:
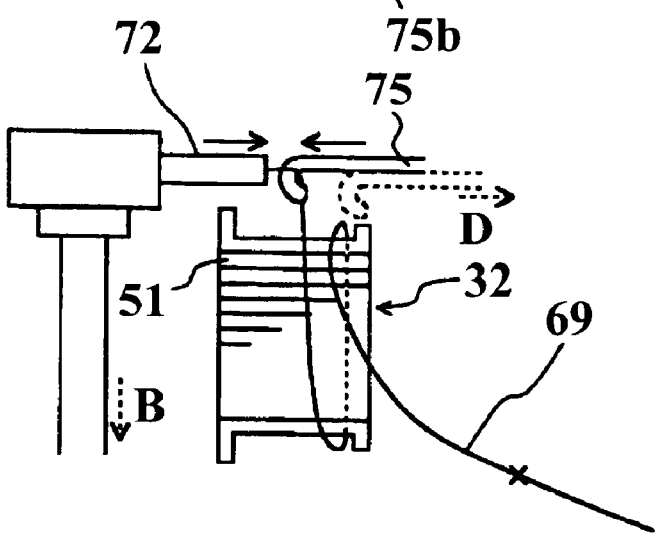

Then, as shown in FIG. 24, the needle 72 and the hook member 75 are moved as indicated by the arrows B and D, respectively, and, as in the case with the FIG. 20, winding of the second turn of the coil is stated. When the needle 72 is above or below the armature 32 during its loop action, the needle 72 is moved either to the right or left (in the direction perpendicular to the drawing plane) until it reaches a position corresponding to a slot mouth 73 on either one side of the magnetic pole tooth 51. Thereby, the needle 72 travels around a rectangular loop around the magnetic pole tooth 51. As described above, the coil is wound around the magnetic pole tooth 51 without inserting the needle 72 into the slots 62.

Figure 25:
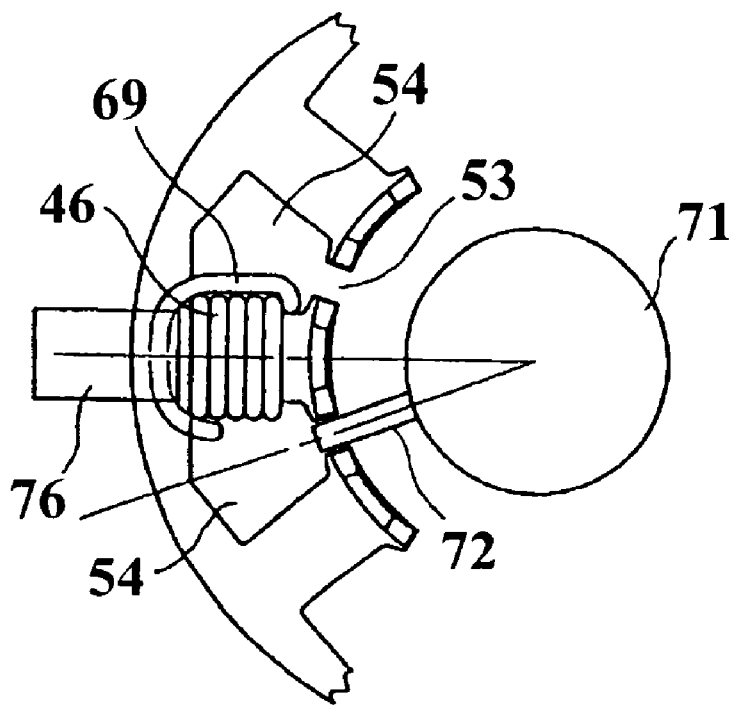
FIG. 25 is a top plan view, in part similar to FIG. 17, and shows another type of coil end restraining mechanism.
Figure 26:
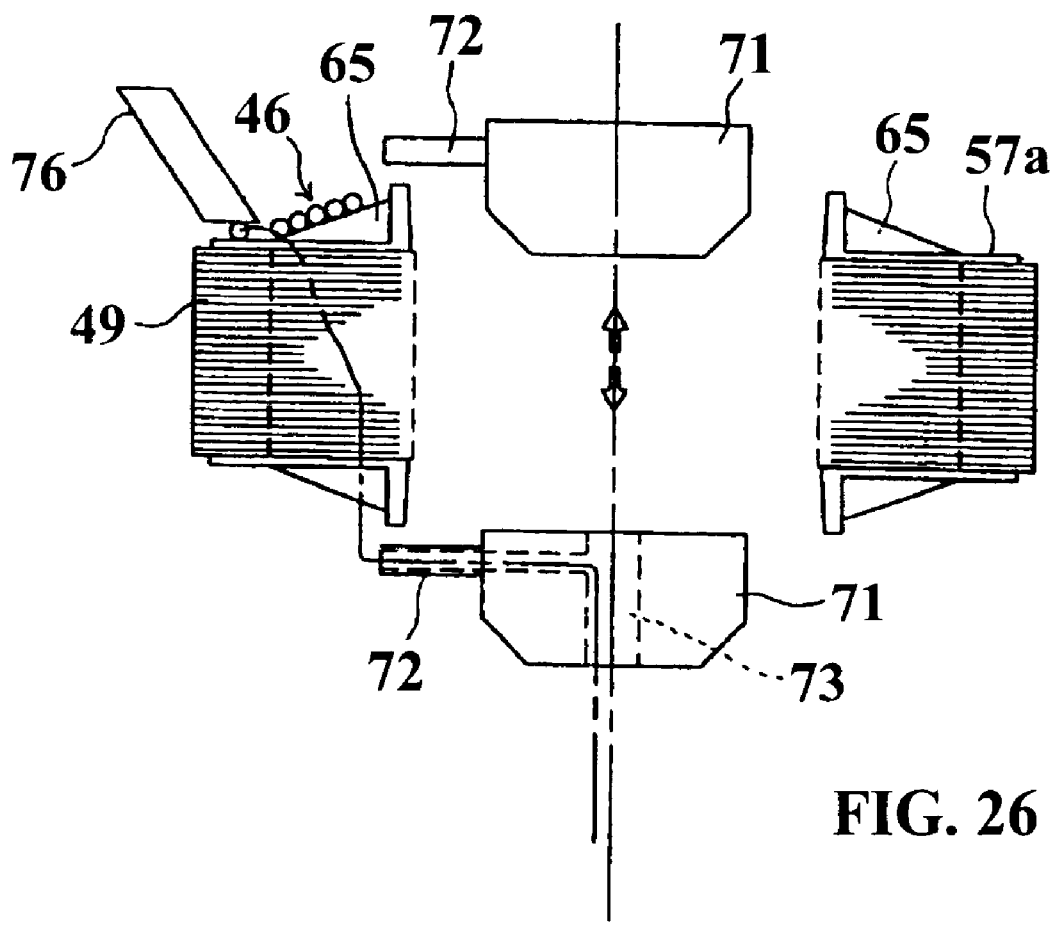
FIG. 26 is a cross sectional view, in part similar to FIG. 18, but showing this embodiment.

FIGS. 25 and 26 illustrate another embodiment of the present invention that does not employ the hook members of the previous embodiment. In this embodiment, when the first winding is wound on the peripheral length changing members 65 from the bottom side thereof (the root side of the magnetic pole tooth 51), a winding starting end of the winding is securely held on a coil end surface 71 of a magnetic pole tooth 51 by a holding member 76. By moving the position of the holding member 76 in accordance with the winding starting point of each turn of the coil, each turn of the coil can be wound in an aligned manner securely. Also, by securely holding the winding starting end for the second layer of the winding by such a holding member 76, the second layer of the coil can be wound in an aligned manner securely on the first layer thereof even when the surface of the peripheral length changing member 65 has become uneven and nonskid due to the first layer of the coil.

After the desired of the winding methods have been performed utilizing any of the aforedescribed winding methods and apparatus, a controller assembly of any desired type 82 (FIG. 1) is mounted on the further projections 64 of the insulating bobbin forming member 57A.

Thus it should be readily apparent from the foregoing description that the described embodiments providing automatic machine winding of armatures having maximum coil density because the winding nozzle does not enter into the slots between the pole teeth and positioning the wire ends at the ends of the core portion of the armature to facilitate winding. Of course, the foregoing description is that of preferred embodiments of the invention and various changes and modifications may be made without departing from the spirit and scope of the invention, as defined by the appended claims.

What is claimed is:

1. A method of winding the coils of a rotating electrical machine on a circular core of magnetic material with a plurality of magnetic pole teeth extending radially from the circular core, each of the magnetic pole teeth defining a core and slots formed there between each of the slots defines a mouth that is formed between adjacent outer ends of the cores, said winding method comprising the steps of positioning a threading needle having an opening through which the wire for the winding of the coils is fed into proximity to one of the mouths, moving the needle opening in a path around one of the pole teeth and at one side of the slot without moving the needle in any substantial distance along the length of the one pole tooth to form a first winding, retaining a portion of at least the initial winding at the circular core side of the pole tooth, continuing the movement of the needle opening in a path around the one of the pole teeth at the one side of the slot without moving the needle in any substantial distance along the length of the one pole tooth to form succeeding windings, the pulling action of restrained winding portion forcing the previous winding along the pole tooth toward the circular core without requiring movement of the needle in any substantial distance along the length of the one pole tooth so that the needle not be moved any substantial distance into the slot.

2. The method of winding the coils of a rotating electrical machine as set forth in claim 1 wherein the winding is restrained by passing it around an abutment.

3. The method of winding the coils of a rotating electrical machine as set forth in claim 2 wherein the abutment and the threading needle are moved relative to each other to place the wire in sliding engagement with the abutment.

4. The method of winding the coils of a rotating electrical machine as set forth in claim 2 wherein the abutment comprises a hook shaped member around which the wire is looped.

5. The method of winding the coils of a rotating electrical machine as set forth in claim 1 wherein the winding is restrained by passing it around a pair of abutments positioned on opposite axially spaced sides of the pole tooth.

6. The method of winding the coils of a rotating electrical machine as set forth in claim 5 wherein the abutments and the threading needle are moved relative to each other to place the wire in sliding engagement with the abutments.

7. The method of winding the coils of a rotating electrical machine as set forth in claim 6 wherein the abutments each comprises a hook shaped member around which the wire is looped.

8. The method of winding the coils of a rotating electrical machine as set forth in claim 1 wherein the winding is restrained by pressing it against an abutment.

9. An apparatus for winding the coils of a rotating electrical machine on a circular core of magnetic material with a plurality of magnetic pole teeth extending radially from the circular core, each of the magnetic pole teeth defining a core and slots formed there between each of the slots defines a mouth that is formed between adjacent outer ends of the cores, apparatus comprising a threading needle having an opening through which the wire for the winding of the coils is fed into proximity to one of the mouths, a drive for moving the needle opening in a path around one of the pole teeth and at one side of the slot without moving the needle in any substantial distance along the length of the one pole tooth to form a first winding, and a restraining device restraining a portion of at least the initial winding at the circular core side of the pole tooth during continuing the movement of the needle opening in a path around the one of the pole teeth at the one side of the slot without moving the needle in any substantial distance along the length of the one pole tooth to form succeeding windings, said restraining device forcing the previous winding along the pole tooth toward the circular core without requiring movement of the needle in any substantial distance along the length of the one pole tooth so that the needle not be moved any substantial distance into the slot during subsequent winding.

10. An apparatus for winding the coils of a rotating electrical machine as set forth in claim 9 wherein the restraining device comprises an abutment.

11. An apparatus for winding the coils of a rotating electrical machine as set forth in claim 10 wherein the drive moves abutment and the threading needle relative to each other to place the wire in sliding engagement with the abutment.

12. An apparatus for winding the coils of a rotating electrical machine as set forth in claim 10 wherein the abutment comprises a hook shaped member around which the wire is looped.

13. An apparatus for winding the coils of a rotating electrical machine as set forth in claim 10 there are a pair of abutments positioned on opposite axially spaced sides of the pole tooth.

14. An apparatus for winding the coils of a rotating electrical machine as set forth in claim 13 wherein the drive moves the abutments and the threading needle relative to each other to place the wire in sliding engagement with the abutments.

15. An apparatus for winding the coils of a rotating electrical machine as set forth in claim 13 wherein the abutments each comprises a hook shaped around which the wire is looped.

16. An apparatus for winding the coils of a rotating electrical machine as set forth in claim 15 wherein the drive moves the hook shaped members and the threading needle relative to each other to place the wire in sliding engagement with the abutments.

17. An apparatus for winding the coils of a rotating electrical machine as set forth in claim 9 wherein the restraining device presses the wire against an abutment.

* * * * *